(12) United States Patent
Erdmann et al.

(10) Patent No.: US 8,459,237 B2
(45) Date of Patent: Jun. 11, 2013

(54) FILL HEAD ASSEMBLY HAVING MEMBRANE FOR PROTECTING RECIRCULATION LINE

(75) Inventors: Matthew L. Erdmann, Ypsilanti, MI (US); Bradley N. Kippe, Goodrich, MI (US)

(73) Assignee: Eaton Corporation, Cleveland, OH (US)

( * ) Notice: Subject to any disclaimer, the term of this patent is extended or adjusted under 35 U.S.C. 154(b) by 335 days.

(21) Appl. No.: 13/010,819

(22) Filed: Jan. 21, 2011

(65) Prior Publication Data

US 2011/0192844 A1 Aug. 11, 2011

Related U.S. Application Data

(60) Provisional application No. 61/303,428, filed on Feb. 11, 2010.

(51) Int. Cl.
*F02M 33/02* (2006.01)

(52) U.S. Cl.
USPC ........... 123/516; 123/518; 123/519; 141/290; 141/307

(58) Field of Classification Search
USPC ................. 123/516, 518, 519; 141/290, 307, 141/366
See application file for complete search history.

(56) References Cited

U.S. PATENT DOCUMENTS

| | | | |
|---|---|---|---|
| 4,699,638 A * | 10/1987 | Harris | 96/113 |
| 4,941,587 A * | 7/1990 | Terada | 220/86.2 |
| 5,042,678 A * | 8/1991 | Munguia | 220/254.9 |
| 5,103,877 A | 4/1992 | Sherwood et al. | |
| 5,740,842 A | 4/1998 | Maier et al. | |
| 7,168,466 B2 * | 1/2007 | Ganachaud et al. | 141/286 |
| 7,261,093 B2 * | 8/2007 | Groom et al. | 123/520 |
| 7,694,665 B2 * | 4/2010 | Ehrman et al. | 123/518 |
| 7,779,820 B2 * | 8/2010 | Rittershofer | 123/516 |
| 2001/0035421 A1 | 11/2001 | Essing | |
| 2003/0230288 A1 * | 12/2003 | King et al. | 123/516 |

FOREIGN PATENT DOCUMENTS

WO 9503949 2/1995

OTHER PUBLICATIONS

International Search Report and Written Opinion of corresponding PCT application.

* cited by examiner

*Primary Examiner* — Erick Solis
(74) *Attorney, Agent, or Firm* — Quinn Law Group, PLLC

(57) ABSTRACT

A fill head assembly for a fuel storage system includes a check valve disposed within a central region of the fill head assembly. The check valve includes a membrane covering a vent outlet of the fill head assembly. The check valve prevents liquid flow from the central region into the vent outlet, while simultaneously allowing vapor flow from the central region into the vent outlet. The membrane includes a micro-porous material that is liquid impermeable, thereby preventing liquid flow through the membrane, and is vapor permeable, thereby allowing vapor flow through the membrane.

20 Claims, 4 Drawing Sheets

FILL HEAD ASSEMBLY HAVING MEMBRANE FOR PROTECTING RECIRCULATION LINE

CROSS-REFERENCE TO RELATED APPLICATIONS

This application claims the benefit if U.S. Provisional Patent Application Ser. No. 61/303,428, filed on Feb. 11, 2010, the disclosure of which is hereby incorporated by reference.

TECHNICAL FIELD

The invention generally relates to a fuel storage system, and more specifically to a fill head assembly of the fuel storage system.

BACKGROUND

Fuel storage systems include a vapor canister that is configured for capturing vapor that is emitted through the fuel storage system. If liquid enters the vapor canister, the vapor canister will not function properly and replacement is typically required.

To prevent outlet liquid from entering the vapor canister, a mechanical valve assembly is provided in the fuel storage system. The mechanical valve assembly includes a moving valve portion that moves to open under pressure in the fuel storage system to allow vapor to escape while preventing liquid from flowing into the canister. The mechanical valve may be disposed at a fuel tank of the fuel storage system, or along a line connecting the fuel tank to the vapor canister.

The fuel storage system also includes a fill head assembly. The fill head assembly receives a liquid fuel from a dispensing head or the like, and directs the liquid to the fuel tank. The fill head assembly may also be in fluid communication with the vapor canister so that fuel vapor generated during refueling may be absorbed by the vapor canister.

SUMMARY

A fuel storage system for a vehicle is provided. The fuel storage system includes a fuel tank, and a vapor canister in fluid communication with the fuel tank. The vapor canister is configured for absorbing vapor. A fill head assembly is in fluid communication with the fuel tank. The fill head assembly is configured for receiving a flow of a liquid and directing the liquid to the fuel tank. A recirculation line is in fluid communication with and interconnects the fill head assembly, the tank and the vapor canister. A check valve is disposed within the fill head assembly. The check valve is configured for blocking liquid flow from the fill head assembly into the recirculation line while simultaneously allowing vapor flow from the fill head assembly into the recirculation line.

A fuel storage system for a vehicle is also provided. The fuel storage system includes a fuel tank, and a vapor canister in fluid communication with the fuel tank. The vapor canister is configured for absorbing vapor. The fuel storage system further includes a fill head assembly. The fill head assembly includes a body defining a central region and a vent outlet. The vent outlet is open to the central region. The fill head assembly is in fluid communication with the fuel tank, and is configured for receiving a flow of a liquid and directing the liquid to the fuel tank. A recirculation line is in fluid communication with and interconnects the vent outlet of the fill head assembly, the tank and the vapor canister. A check valve is disposed within the central region of the fill head assembly about an outer perimeter of the vent outlet. The check valve is configured for blocking liquid flow from the fill head assembly into the recirculation line, while simultaneously allowing vapor flow from the fill head assembly into the recirculation line. The check valve includes a membrane formed from a micro-porous material that is liquid impermeable such that liquid is prevented from flowing through the micro-porous material, and vapor permeable such that vapor is allowed to flow through the micro-porous material. The check valve includes a support structure that is configured to position the membrane within the central region of the fill head assembly adjacent to and about the vent outlet. The support structure is also configured to support the membrane against deformation. The check valve includes a pressure sensitive valve attached to and supported by the support structure. The pressure sensitive valve is disposed in a closed position when a fluid pressure in the central region of the fill head assembly is greater than a fluid pressure within the recirculation line. The pressure sensitive valve is disposed in an open position when the fluid pressure in the recirculation line is greater than the fluid pressure within the central region of the fill head assembly.

A fill head assembly for a fuel storage system is also provided. The fill head assembly includes a body defining an open central region and a vent outlet. The vent outlet extends through the body, and is open to the central region of the body. A check valve is disposed within the central region. The check valve is configured for blocking liquid flow from the central region through the vent outlet while simultaneously allowing vapor flow from the central region through the vent outlet.

Accordingly, positioning the check valve within the central region of the fill head improves vehicle packaging of the fuel system, and reduces the chances of leaks and joints negatively affecting permeation.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, a fuel storage system is generally shown at 20. The fuel storage system 20 is for a vehicle, and stores a liquid fuel such as but not limited to gasoline or diesel fuel.

Figure 1:
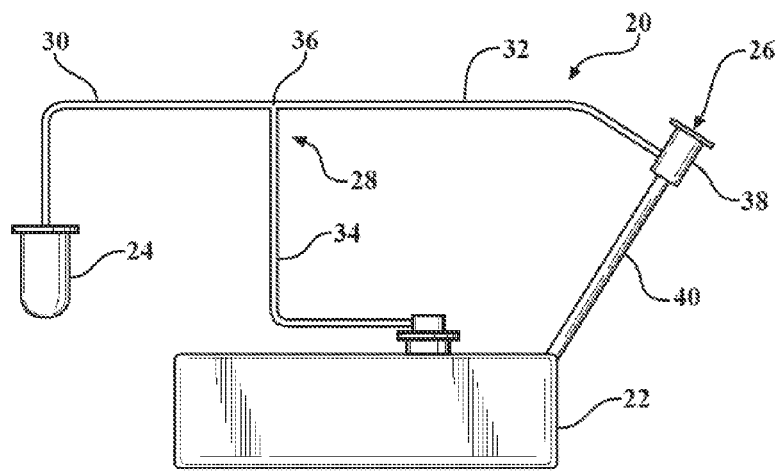
FIG. 1 is a schematic diagram of a fuel storage system.

Referring to FIG. 1, the fuel storage system 20 includes a fuel tank 22, a vapor canister 24 and a fill head assembly 26. A recirculation line 28 is in fluid communication with and interconnects the fill head assembly 26, the fuel tank 22 and the vapor canister 24. The recirculation line 28 may include a plurality of line segments. As shown, the recirculation line 28 includes a first line segment 30, a second line segment 32 and a third line segment 34, all meeting at a junction 36. The first line segment 30 extends between the junction 36 and the vapor canister 24. The second line segment 32 extends between the junction 36 and the fill head assembly 26. The third line segment 34 extends between the fuel tank 22 and the junction 36. The first line segment 30, the second line segment 32 and the third line segment 34 are all connected to each other and in fluid communication with each other at the junction 36.

The vapor canister 24 is in fluid communication with the fuel tank 22 through the first line segment 30 and the third line segment 34. The vapor canister 24 is configured for absorbing vapor, i.e., fuel vapor, from within the fuel storage system 20. During refueling of the fuel tank 22, vapors are generated, which travel from the tank 22 and the fill head assembly 26 through the recirculation line 28 to the vapor canister 24, which stores the vapors therein. An engine draws the vapors from the vapor canister 24 to fuel the engine as needed. The vapor canister 24 may include, but is not limited to an activated carbon packed canister or some similar vapor canister 24 suitable for absorbing fuel vapors in a fuel storage system 20.

Figure 2:
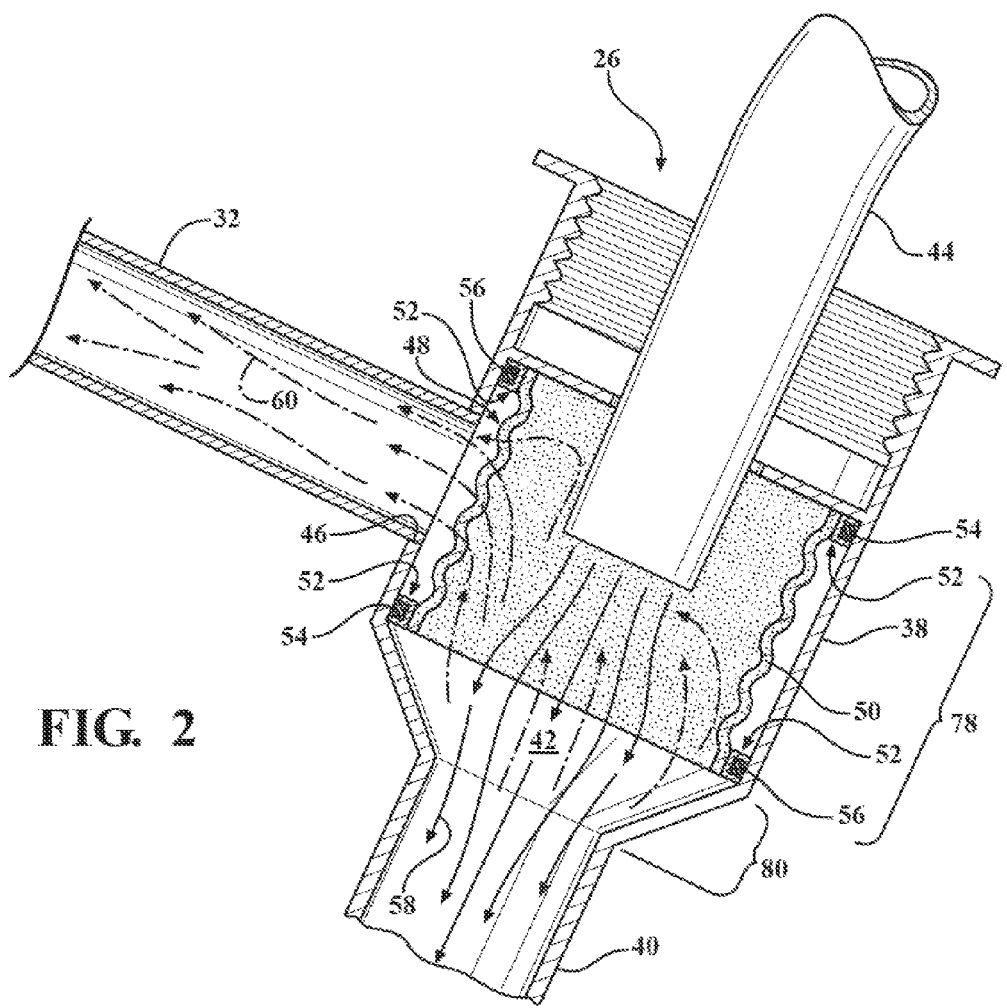
FIG. 2 is a schematic cross sectional view of a fill head assembly of the fuel storage system showing a first embodiment of a check valve.

The fill head assembly 26 is in fluid communication with the fuel tank 22. The fill head assembly 26 includes a body 38 and a fill neck 40 extending from the body 38 to the fuel tank 22. Referring also to FIG. 2, the body 38 of the fill head assembly 26 defines a central region 42. The fill neck 40 is in fluid communication with and interconnects the central region 42 of the body 38 and the fuel tank 22. The fill head assembly 26 is configured for receiving a flow of a liquid, i.e., fuel, and directing the liquid to the fuel tank 22. A dispensing head 44 may be inserted into the central region 42 to dispense fuel therein. Accordingly, the central region 42 receives the liquid, and the fill neck 40 directs the liquid from the central region 42 to the fuel tank 22.

The fill head assembly 26 defines a vent outlet 46. More specifically, the body 38 defines the vent outlet 46. The vent outlet 46 is open to the central region 42. Accordingly, the vent outlet 46 is an opening in the body 38 of the fill head assembly 26 that opens into the central region 42 of the body 38. The vent outlet 46 is in fluid communication with the recirculation line 28. More specifically, the vent outlet 46 is in fluid communication and connected to the second line segment 32 of the recirculation line 28. As such, the vent outlet 46 is in fluid communication with the vapor canister 24 through the first line segment 30 and the second line segment 32.

In order to keep liquid from entering the vapor canister 24 and thereby negatively affecting the vapor canister 24, a check valve 48 is disposed within the fill head assembly 26. As shown in the Figures, the check valve 48 is disposed in a cylindrical portion 78 of the fill head assembly 26. However, the check valve 48 may alternatively be disposed within a conical portion 80 of the fill head assembly 26. Referring to FIG. 2, the check valve 48 is configured for blocking liquid flow, indicated by solid flow lines 58, from the fill head assembly 26 into the recirculation line 28, while simultaneously allowing vapor flow, indicated by dashed flow lines 60, from the fill head assembly 26 into the recirculation line 28. The check valve 48 is disposed within the central region 42 of the body 38, about an outer perimeter of the vent outlet 46, thereby blocking liquid flow through the vent outlet 46 while allowing vapor flow through the vent outlet 46.

The check valve 48 includes a membrane 50 formed from a micro-porous material. The membrane 50 at least partially covers the vent outlet 46. As shown FIG. 2, the membrane 50 completely covers the vent outlet 46. The micro-porous material is liquid impermeable such that liquid is prevented from flowing through the micro-porous material. Additionally, the micro-porous material is vapor permeable such that vapor is allowed to flow through the micro-porous material. The micro-porous material may include but is not limited to an oleophobic membrane with a surface treatment to improve repellency. The membrane 50 may be unsupported or supported. If the membrane 50 is supported, then the membrane 50 may be supported on a non-woven substrate to enhance mechanical properties.

Figure 3:
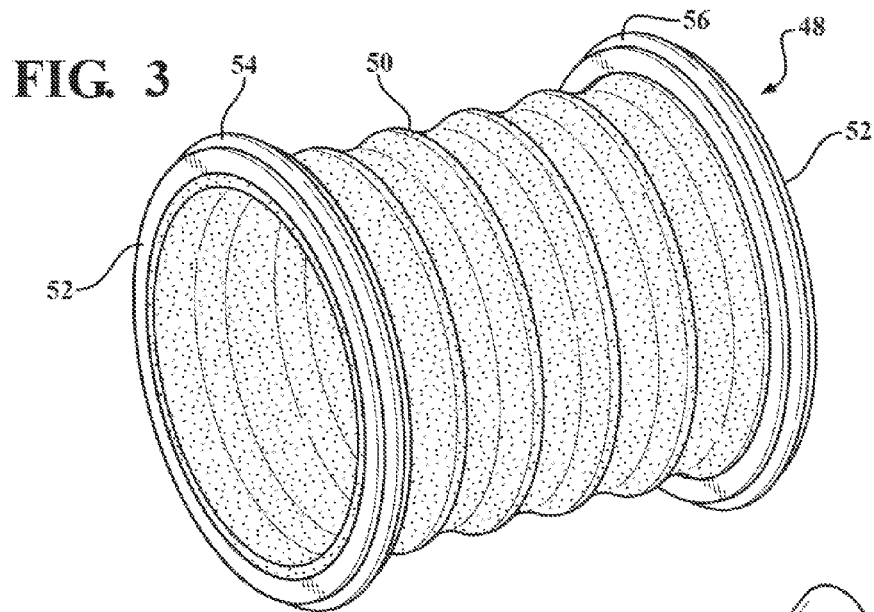
FIG. 3 is a schematic perspective view of the first embodiment of the check valve.
Figure 4:
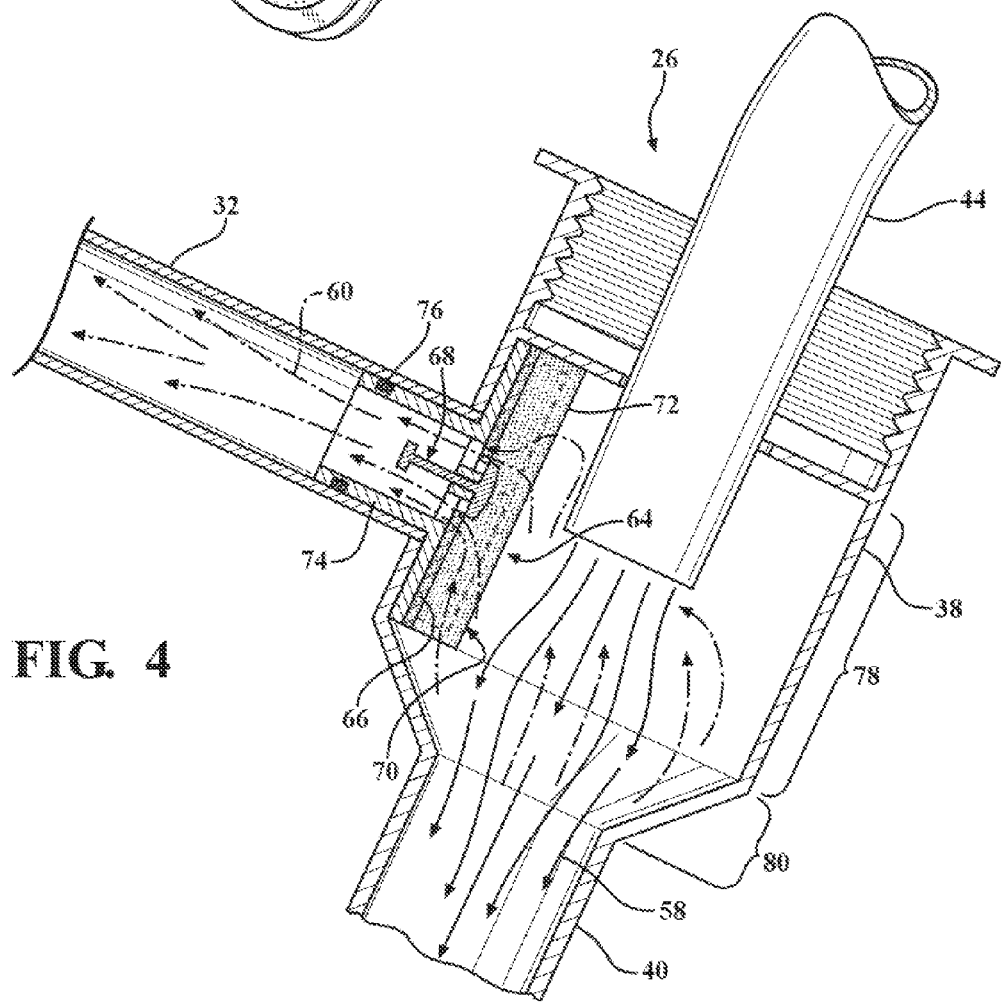
FIG. 4 is a schematic cross sectional view of the fill head assembly showing a second embodiment of the check valve in a closed position.
Figure 5:
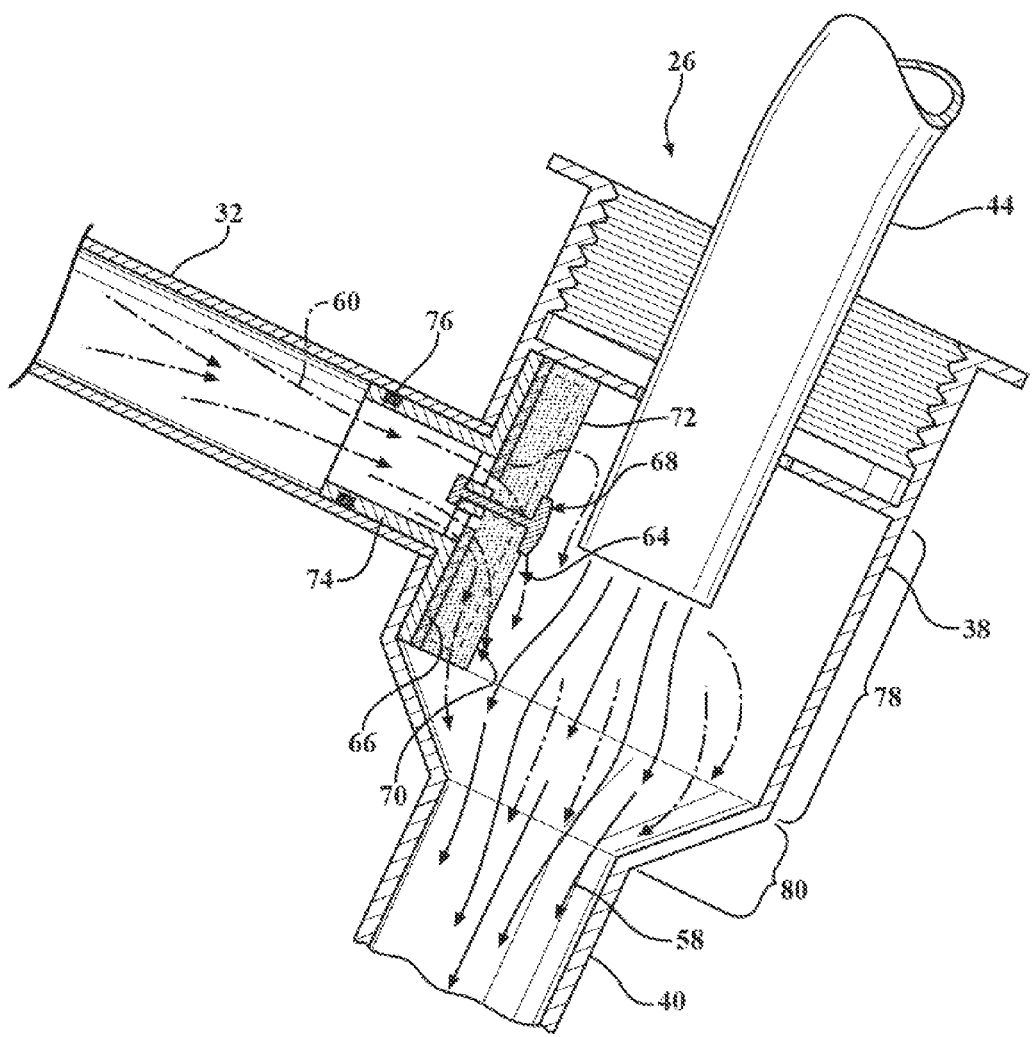
FIG. 5 is a schematic cross sectional view of the fill head assembly showing the second embodiment of the check valve in an open position.
Figure 6:
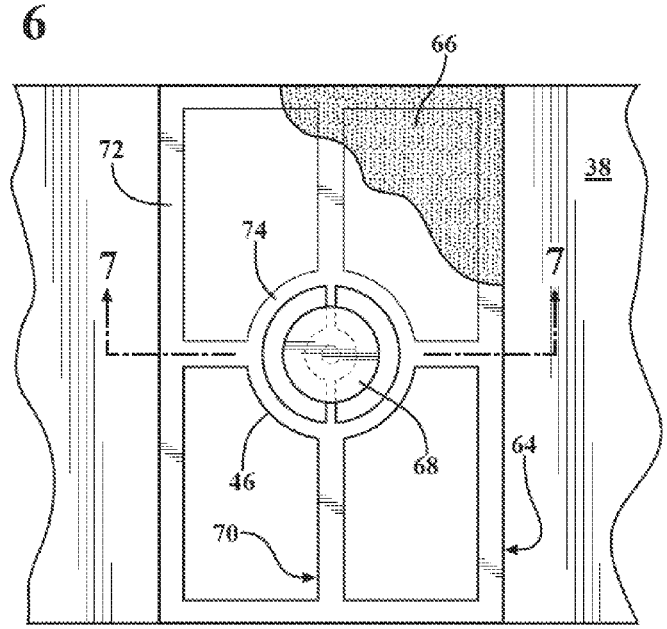
FIG. 6 is a schematic plan view of the second embodiment of the check valve.
Figure 7:
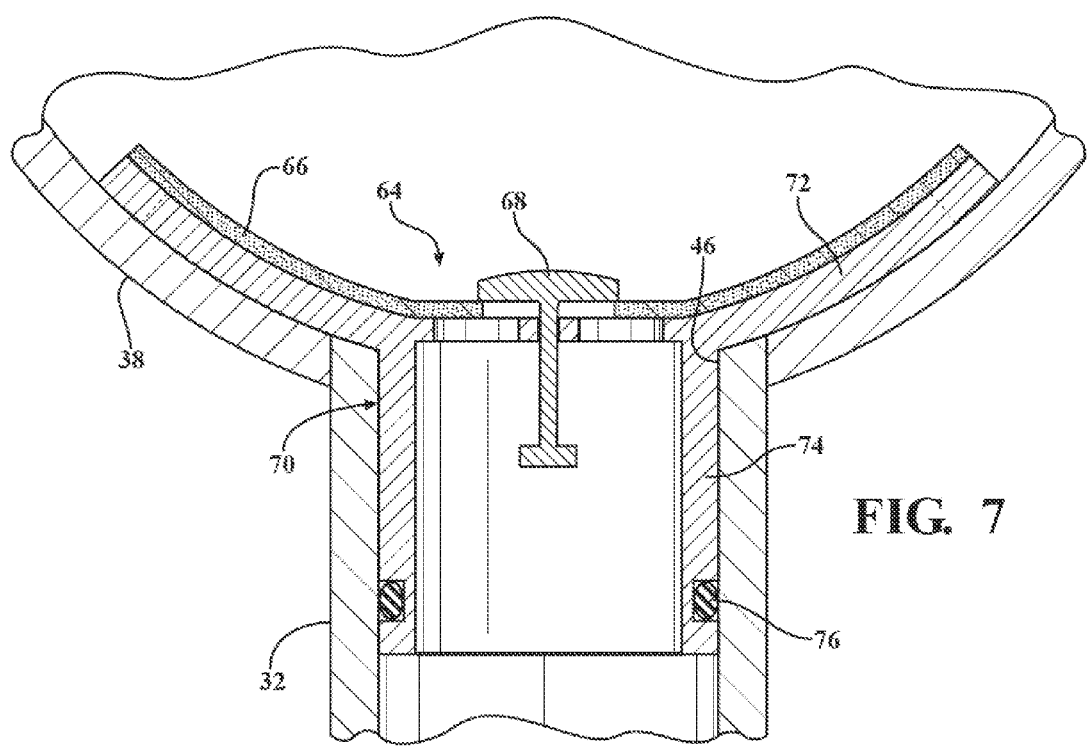
FIG. 7 is a schematic cross sectional view of the second embodiment of the check valve.

The check valve 48 further includes a support structure 52 that is configured to position the membrane 50 within the central region 42 of the fill head assembly 26 adjacent to and about the vent outlet 46. The support structure 52 is also configured to support the membrane 50 against deformation and protect the membrane 50 from damage caused by insertion of the dispensing head 44 into the central region 42 of the fill head assembly 26. As shown in FIGS. 2 and 3, the support structure 52 defines a tubular shape formed to fit within a perimeter of the central region 42. The tubular shape may include any shape conforming to and matching an interior shape of the body 38 of the fill head assembly 26. For example, the tubular shape may include but is not limited to a cylindrical shape such as shown in FIGS. 2 and 3. The support structure 52 may include any number of ribs, braces, struts, etc., that are necessary to fully support the membrane 50 and protect the membrane 50 from damage. The support structure 52 may be shaped, sized and/or configured in any manner suitable to fit within the central region 42 of the body 38.

The check valve 48 includes at least one seal 54, 56. The seal 54, 56 is in sealing engagement between the support structure 52 and the body 38 of the fill head assembly 26. The seal 54, 56 seals around the perimeter of the vent outlet 46 to prevent liquid from seeping between the support structure 52 and the body 38 of the fill head assembly 26, and into the vent outlet 46. As shown in FIG. 2, the seal 54, 56 includes a first seal 54 and a second seal 56. The seal 54, 56 may include but is not limited to an o-ring or some other similar sealing device and/or structure.

Referring to FIGS. 4 through 7, an alternative embodiment of the check valve is generally shown at 64. Check valve 64 includes a membrane 66 formed from the micro-porous material described above. The membrane 66 only partially covers the vent outlet 46, with a pressure sensitive valve 68 (described in greater detail below) covering the remainder of the vent outlet 46. The check valve 64 includes a support structure 70. The support structure 70 supports and protects the membrane 66. As shown, the support structure 70 includes a base portion 72 and a tubular portion 74. The base portion 72 is disposed within the central region 42 of the body 38, and defines a shape that conforms to a portion of the perimeter of the central region 42. Accordingly, the base portion 72 of the support structure 70 conforms to an interior perimeter of the central region 42, thereby disposing the check valve 64 out of the path of the dispensing head 44. The base portion 72 may include any shape suitable to correspond with and match the interior shape and size of the interior region. As shown, the base portion 72 of the support structure 70 includes a semicircular concave shape that mates with a cylindrical central region 42. However, it should be appreciated that the central region 42 of the body 38 and the base portion 72 of the support structure 70 may be shaped in some other manner not shown or described herein.

The tubular portion 74 extends away from the base portion 72 and through the vent outlet 46 into engagement with the recirculation line 28. More specifically, the tubular portion 74 is engaged with the second line segment 32 of the recirculation line 28. The check valve 64 may include a seal 76, such as but not limited to an o-ring or the like, disposed about the outer perimeter of the tubular portion 74 and in sealing engagement with an inner diameter of the recirculation line 28.

As noted above, the check valve 64 includes the pressure sensitive valve 68. The pressure sensitive valve 68 is attached to and supported by the support structure 70. The pressure sensitive valve 68 may include, but is not limited to an umbrella valve, a flapper valve or some other similar valve. The pressure sensitive valve 68 is disposed in a closed position, shown in FIG. 4, when a fluid pressure in the central region 42 of the fill head assembly 26 is greater than a fluid pressure within the recirculation line 28, thereby preventing liquid from flowing through the vent outlet 46. When the pressure sensitive valve 68 is in the closed position, the membrane 66 still allows vapor therethrough and into the recirculation line 28. When the fluid pressure in the recirculation line 28 is greater than the fluid pressure within the central region 42 of the fill head assembly 26, the pressure sensitive valve 68 is disposed in an open position, shown in FIG. 5. When the pressure sensitive valve 68 is in the open position, air and/or vapor may flow uninhibited from the recirculation line 28 into the central region 42 of the body 38.

While the best modes for carrying out the invention have been described in detail, those familiar with the art to which this invention relates will recognize various alternative designs and embodiments for practicing the invention within the scope of the appended claims.

The invention claimed is:

1. A fuel storage system for a vehicle, the fuel storage system comprising:
    a fuel tank;
    a vapor canister in fluid communication with the fuel tank and configured for absorbing vapor;
    a fill head assembly in fluid communication with the fuel tank and configured for receiving a flow of a liquid and directing the liquid to the fuel tank;
    a recirculation line in fluid communication with the fill head assembly, the tank and the vapor canister; and
    a check valve disposed within the fill head assembly and configured for blocking liquid flow from the fill head assembly into the recirculation line while simultaneously allowing vapor flow from the fill head assembly into the recirculation line.

2. A fuel storage system as set forth in claim 1 wherein the check valve includes a membrane formed from a micro-porous material.

3. A fuel storage system as set forth in claim 2 wherein the micro-porous material is liquid impermeable and vapor permeable such that liquid is prevented from flowing through the micro-porous material and vapor is allowed to flow through the micro-porous material.

4. A fuel storage system as set forth in claim 3 wherein the fill head assembly defines a central region and defines a vent outlet in fluid communication with the recirculation line and open to the central region, with the check valve disposed within the central region and about an outer perimeter of the vent outlet.

5. A fuel storage system as set forth in claim 4 wherein the membrane at least partially covers the vent outlet.

6. A fuel storage system as set forth in claim 5 wherein the check valve includes a support structure configured to position the membrane within the central region of the fill head assembly adjacent to and about the vent outlet, and to support the membrane against deformation.

7. A fuel storage system as set forth in claim 6 wherein the check valve includes at least one seal in sealing engagement between the support structure and the fill head assembly.

8. A fuel storage system as set forth in claim 7 wherein the support structure defines a tubular shape formed to fit within a perimeter of the central region.

9. A fuel storage system as set forth in claim 8 wherein the tubular shape includes a cylindrical shape.

10. A fuel storage system as set forth in claim 7 wherein the support structure includes a base portion disposed within the central region and defining a shape that conforms to a portion of the perimeter of the central region.

11. A fuel storage system as set forth in claim 10 wherein the support structure includes a tubular portion extending away from the base portion and through the vent outlet into engagement with the recirculation line.

12. A fuel storage system as set forth in claim 7 wherein the check valve includes a pressure sensitive valve attached to and supported by the support structure, wherein the pressure sensitive valve is disposed in a closed position when a fluid pressure in the central region of the fill head assembly is greater than a fluid pressure within the recirculation line, and is disposed in an open position when the fluid pressure in the recirculation line is greater than the fluid pressure within the central region of the fill head assembly.

13. A fuel storage system as set forth in claim 12 wherein the pressure sensitive valve includes an umbrella valve.

14. A fuel storage system for a vehicle, the fuel storage system comprising:
    a fuel tank;
    a vapor canister in fluid communication with the fuel tank and configured for absorbing vapor;
    a fill head assembly having a body defining a central region and a vent outlet open to the central region, wherein the fill head assembly is in fluid communication with the fuel tank and configured for receiving a flow of a liquid and directing the liquid to the fuel tank;
    a recirculation line in fluid communication with the vent outlet of the fill head assembly, the tank and the vapor canister; and
    a check valve disposed within the central region of the fill head assembly about an outer perimeter of the vent outlet, and configured for blocking liquid flow from the fill head assembly into the recirculation line while simultaneously allowing vapor flow from the fill head assembly into the recirculation line;
    wherein the check valve includes a membrane formed from a micro-porous material that is liquid impermeable and vapor permeable, such that liquid is prevented from flowing through the micro-porous material and vapor is allowed to flow through the micro-porous material;
    wherein the check valve includes a support structure configured to position the membrane within the central region of the fill head assembly adjacent to and about the vent outlet, and to support the membrane against deformation; and
    wherein the check valve includes a pressure sensitive valve attached to and supported by the support structure, wherein the pressure sensitive valve is disposed in a closed position when a fluid pressure in the central region of the fill head assembly is greater than a fluid pressure within the recirculation line, and is disposed in an open position when the fluid pressure in the recirculation line is greater than the fluid pressure within the central region of the fill head assembly.

15. A fill head assembly for a fuel storage system, the fill head assembly comprising:
   a body defining an open central region and a vent outlet extending through the body and open to the central region of the body;
   a check valve disposed within the central region and configured for blocking liquid flow from the central region through the vent outlet while simultaneously allowing vapor flow from the central region through the vent outlet.

16. A fill head assembly as set forth in claim 15 wherein the check valve includes a membrane formed from a micro-porous material.

17. A fill head assembly as set forth in claim 16 wherein the micro-porous material is liquid impermeable and vapor permeable such that liquid is prevented from flowing through the micro-porous material and vapor is allowed to flow through the micro-porous material.

18. A fill head assembly as set forth in claim 17 wherein the check valve includes a support structure configured to position the membrane within the central region of the body adjacent to and about the vent outlet, and to support the membrane against deformation.

19. A fill head assembly as set forth in claim 18 wherein the check valve includes at least one seal in sealing engagement between the support structure and the body.

20. A fill head assembly as set forth in claim 18 wherein the check valve includes a pressure sensitive valve attached to and supported by the support structure, wherein the pressure sensitive valve is moveable between an open position and a closed position in response to a difference between a fluid pressure within the central region of the body and a fluid pressure at the vent outlet external to the central region of the body.

* * * * *